US010146009B2

(12) United States Patent
Badihi et al.

(10) Patent No.: US 10,146,009 B2
(45) Date of Patent: Dec. 4, 2018

(54) SILICON PHOTONICS CONNECTOR

(71) Applicant: MELLANOX TECHNOLOGIES LTD., Yokneam (IL)

(72) Inventors: Avner Badihi, D.N. Harey Yehuda (IL); Yaara Kavdiel, Kibbutz Eilon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 11 days.

(21) Appl. No.: 15/250,999

(22) Filed: Aug. 30, 2016

(65) Prior Publication Data

US 2016/0370544 A1 Dec. 22, 2016

Related U.S. Application Data

(63) Continuation-in-part of application No. 15/149,134, filed on May 8, 2016, now Pat. No. 9,804,348, which
(Continued)

(51) Int. Cl.
| | | |
|---|---|---|
| *G02B 6/42* | (2006.01) | |
| *G02B 6/30* | (2006.01) | |
| *G02B 6/32* | (2006.01) | |
| *G02B 6/38* | (2006.01) | |
| *G02B 6/43* | (2006.01) | |

(52) U.S. Cl.
CPC ............. *G02B 6/30* (2013.01); *G02B 6/32* (2013.01); *G02B 6/3882* (2013.01); *G02B 6/3885* (2013.01); *G02B 6/423* (2013.01); *G02B 6/424* (2013.01); *G02B 6/428* (2013.01); *G02B 6/4214* (2013.01); *G02B 6/4249* (2013.01); *G02B 6/4284* (2013.01); *G02B 6/4269* (2013.01); *G02B 6/43* (2013.01)

(58) Field of Classification Search
CPC .......... G02B 6/30; G02B 6/32; G02B 6/3817; G02B 6/3831; G02B 6/3882; G02B 6/3885; G02B 6/4204; G02B 6/4206; G02B 6/423; G02B 6/424; G02B 6/4249; G02B 6/4214; G02B 6/428; G02B 6/4284
USPC ................ 385/14, 33, 49–52, 53–78, 88–92
See application file for complete search history.

(56) References Cited

U.S. PATENT DOCUMENTS

| | | | |
|---|---|---|---|
| 5,195,150 A | 3/1993 | Stegmueller et al. | |
| 6,921,214 B2 * | 7/2005 | Wilson ................. | G02B 6/4204 385/89 |

(Continued)

OTHER PUBLICATIONS

Rumpler et al., "Continuous-Wave Electrically Pumped 1.55-μm Edge-Emitting Platelet Ridge Laser Diodes on Silicon," IEEE Photonics Technology Letters, vol. 21, No. 13, Jul. 1, 2009, pp. 827-829.*

(Continued)

*Primary Examiner* — Michael Mooney
(74) *Attorney, Agent, or Firm* — D. Kligler IP Services Ltd.

(57) ABSTRACT

Optical apparatus connecting a Silicon Photonics (SiP) device, which comprises multiple optical waveguides to an array of collimating lenses, configured to collimate light of the multiple optical waveguides into collimated beams. The optical apparatus includes a deflection element, distinct from the SiP device, including a light deflection surface which deflects light from the waveguides by an angle greater than 30 degrees, to the array of collimating lenses.

29 Claims, 12 Drawing Sheets

Related U.S. Application Data is a continuation-in-part of application No. 13/935,515, filed on Jul. 4, 2013, now abandoned.

(56) References Cited

U.S. PATENT DOCUMENTS

| | | |
|---|---|---|
| 2004/0082112 A1 | 4/2004 | Stephens |
| 2006/0204178 A1 | 9/2006 | Theuerkorn et al. |
| 2007/0086723 A1 | 4/2007 | Sasaki et al. |
| 2007/0140627 A1* | 6/2007 | Lu .................. G02B 6/4206 385/89 |
| 2010/0215313 A1 | 8/2010 | Matsuoka et al. |
| 2011/0188054 A1 | 8/2011 | Petronius et al. |
| 2012/0093462 A1* | 4/2012 | Childers ............ G02B 6/3831 385/33 |
| 2013/0148930 A1* | 6/2013 | Ko .................. G02B 6/3817 385/88 |
| 2013/0181233 A1* | 7/2013 | Doany ............ H01L 21/76251 257/88 |
| 2014/0294339 A1 | 10/2014 | Lagziel et al. |

OTHER PUBLICATIONS

U.S. Appl. No. 15/149,134 Office Action dated Mar. 7, 2017.

Naoe et al., "40-Gb/s (4ch x 10-Gb/s) Operation of 1.3-μm Lens-Integrated Surface-Emitting Laser (LISEL) Array up to 95° C.", 2014 International Semiconductor Laser Conference (ISLC), 2 pages, Sep. 7-10, 2014.

Wang et al., "45 Degree Polymer Micromirror Integration for Board-Level Three-Dimensional Optical Interconnects", Optics Express, vol. 17, No. 13, 8 pages, Jun. 22, 2009.

Arbabi et al., "Efficient high NA flat micro-lenses realized using high contrast transmitarrays", Proceedings of SPIE, vol. 9372, pp. 93720P-1-93720P-7, year 2015.

Anderson et al., "Technologies & Architectures for Next Gen Ethernet Optical Client Interfaces", Joint ITU-T/IEEE Workshop on the Future of Ethernet Transport, 19 pages, May 28, 2010.

Suzuki et al., "A Light Source Using 13-μm Lens-Integrated Surface-Emitting Laser for Silicon Platforms", IEEE Photonics Technology Letters, vol. 26, No. 11, pp. 1089-1091, Jun. 1, 2014.

* cited by examiner

TO LENSES 848

SILICON PHOTONICS CONNECTOR

RELATED APPLICATIONS

This application is a continuation in part (CIP) of U.S. patent application Ser. No. 15/149,134, filed May 8, 2016, which is a continuation in part (CIP) of U.S. patent application Ser. No. 13/935,515, filed Jul. 4, 2013. The disclosures of these related applications are incorporated herein by reference in their entirety.

FIELD OF THE INVENTION

The present invention relates generally to optical interconnection, and particularly to methods and systems for interconnection between Silicon Photonics (SiP) devices and optical fibers.

BACKGROUND OF THE INVENTION

Silicon Photonics (SiP) is a technology that enables entire optical systems to be manufactured using Silicon processes, with Silicon as the optical medium. Various optical components, such as interconnects and signal processing components, may be fabricated and integrated in a single SiP device. Some SiP devices are fabricated on a Silica substrate or over a silica layer on a Silicon substrate, a technology that is often referred to as Silicon on Insulator (SOI).

In some cases it is desired to manage optical communications between a SiP and other devices. Such communications require accurate alignment of the light signals on the SiP with an external means for receiving the light.

Long range transmission of light signals is generally performed within optical fibers. When optical signals are generated or processed in a SiP and need to be transmitted over optical fibers, the light needs to be coupled between the SiP and the optical fibers. This coupling is a challenge, since waveguides within a SiP generally have a smaller diameter than optical fibers.

US patent publication 2011/0116741 to Cevini et al. describes an optical mode transformer for coupling an optical fiber and a high-index contrast waveguide.

US patent publication 2013/0084039 to Doany et al. describes a lens array for optical coupling of a photonic chip to an array of optical fibers.

U.S. Pat. No. 7,298,941 to Palen et al. describes optical coupling to an IC chip using a slanted lens.

SUMMARY OF THE INVENTION

There is herein provided in accordance with an embodiment of the present invention, an optical apparatus, comprising a Silicon Photonics (SiP) device, which comprises multiple optical waveguides, an array of collimating lenses, configured to receive light from the multiple optical waveguides direct paths not including optical fibers and to collimate the light of the multiple optical waveguides into collimated beams; and a receptacle configured to receive an external optical device in an orientation aligned with the collimated beams from the array of collimating lenses.

Optionally, the SiP device is located within a casing which defines the receptacle. Optionally, the optical apparatus includes at least one electrical chip included in the casing and the casing further includes at least one electrical connector connecting the at least one electrical chip to external electrical devices. Optionally, the SiP device is configured to convey to the collimating lenses, light beams carrying data from the at least one electrical chip. Optionally, the receptacle is configured to removably receive the external optical device. Optionally, the receptacle is configured to removably receive a ferrule of optical fibers, such that the optical fibers are aligned to the collimated beams. Optionally, the optical apparatus includes a light deflection surface which deflects light from the waveguides by an angle greater than 30 degrees, to the array of collimating lenses. Optionally, the light deflection surface deflects light from the waveguides by an angle of 90 degrees to the array of collimating lenses, such that the collimated light is perpendicular to an optical axis of light exiting the waveguides. Optionally, the light deflection surface is included in a silicon substrate and wherein the array of collimating lenses is integrally defined in the silicon substrate.

There is further provided, a method of transmitting an optical signal, including generating an optical signal by a Silicon Photonics (SiP) device, transmitting the optical signal from the SiP device through a waveguide of the SiP device, forwarding the light transmitted from the waveguide to a collimating lens, collimating the light by the collimating lens, receiving an external optical device in a receptacle of the SiP device; and transmitting the collimated light to the external optical device in the receptacle. Optionally, forwarding the light transmitted from the waveguide to the collimating lens comprises deflecting the light from the waveguide by an angle of 90 degrees to the collimating lens, such that the collimated light is perpendicular to an optical axis of the light exiting the waveguide.

There is further provided, an optical system, comprising a first Silicon Photonics (SiP) device, which comprises a first set of one or more optical waveguides, a second Silicon Photonics (SiP) device, which comprises a second set of one or more optical waveguides; and an optical arrangement configured to convey light from the first set of optical waveguides to the second set of optical waveguides without passing through optical fibers.

Optionally, the optical system of Claim 12, wherein the optical arrangement comprises a first set of collimating lenses for collimating light from the first set of optical waveguides and a second set of collimating lenses for collimating light from the second set of optical waveguides, wherein the optical arrangement aligns light beams from the first collimating lenses to the second collimating lenses. Optionally, the optical arrangement conveys light between the first and second collimating lenses, in free space. Optionally, the optical arrangement comprises first and second deflecting surfaces which deflect the light from the first and second waveguides, respectively, by at least 30 degrees.

There is further provided an optical system, comprising a backplane, a first receptacle on the backplane configured to receive a card having a Silicon Photonics (SiP) device mounted thereon, a second receptacle on the backplane configured to receive a card having a Silicon Photonics (SiP) device mounted thereon; and an optical arrangement on the backplane configured to convey light from a first set of optical waveguides of a SiP of a card located in the first receptacle to a second set of optical waveguides in a SiP on a card located in the second receptacle. Optionally, the optical arrangement conveys light between the first and second without passing through optical fibers. Optionally, the optical arrangement conveys light between the first and second through optical fibers.

There is further provided in accordance with an embodiment of the present invention, an optical apparatus, comprising a Silicon Photonics (SiP) device, which comprises multiple optical waveguides, an array of collimating lenses, configured to collimate light of the multiple optical waveguides into collimated beams; and a deflection element, distinct from the SiP device, including a light deflection surface which deflects light from the waveguides by an angle greater than 30 degrees, to the array of collimating lenses.

Optionally, the light deflection surface deflects light from the waveguides by an angle of 90 degrees to the array of collimating lenses, such that the collimated light is perpendicular to an optical axis of light exiting the waveguides. Optionally, the light deflection surface is slanted at an angle different than 45 degrees relative to the optical axis of light exiting the waveguides. Optionally, the apparatus includes a light transparent material between the waveguides and the light deflection surface, the light transparent material having a refractive index selected to deflect the light from the waveguides, so that the deflection surface directs the light to the array of collimating lenses.

In some embodiments, the light deflection surface is included in a deflection substrate, distinct from the SiP device, and wherein the light transparent material attaches the SiP device to the deflection substrate.

Optionally, the optical waveguides are characterized by a first optical spot size, and wherein the collimating lenses are configured to provide light of a second optical spot size, larger than the first optical spot size. Optionally, the apparatus includes a casing defining a slot or at least one pin configured to receive a ferrule of optical fibers, such that the fibers of the ferrule are aligned with the collimated light from the array of collimating lenses through the mirror.

Optionally, the apparatus includes a casing defining a slot or at least one pin configured to receive a ferrule of optical fibers, such that the fibers are aligned with the collimated light from the array of collimating lenses. Optionally, the slot is configured to removably receive the ferrule. Optionally, the light deflection surface is included in a deflection substrate separate from the silicon photonics device. Optionally, the array of collimation lenses is integrally defined in the deflection substrate.

Optionally, the deflection substrate and the silicon photonics device are aligned by elastic averaging alignment. Optionally, the light deflection surface comprises a photoimageable polymer deposited on the silicon photonics substrate. Optionally, the array of collimating lenses is located on a face of the SiP device opposite a face of the SiP device contacting the deflection element.

Optionally, the apparatus includes a plurality of deflection elements, each servicing a respective sub-group of one or more of the waveguides. Optionally, at least two of the sub-groups of one or more of the waveguides extend to different lengths along the SiP device. Optionally, a method of transmitting an optical signal, comprising transmitting an optical signal through a waveguide of a SiP device, deflecting the light transmitted from the waveguide by a deflection surface distinct from the SiP device, by an angle greater than 30 degrees, to a collimating lens, and collimating the light by the collimating lens.

Optionally, deflecting the light comprises deflecting the light from the waveguide by an angle of 90 degrees to the collimating lens, such that the collimated light is perpendicular to an optical axis of the light exiting the waveguide.

Optionally, deflecting the light comprises deflecting by a light deflecting slanted surface, slanted at an angle different than 45 degrees relative to the optical axis of light exiting the waveguide. Optionally, deflecting the light comprises additionally deflecting the light by a light transparent material between the waveguide and the light deflecting slanted surface, the light transparent material having a refractive index selected to deflect the light, so that the slanted surface directs the light to the collimating lens.

Optionally, the light transparent material attaches the SiP device to a light deflection substrate including the deflection surface. Optionally, transmitting the optical signal from the SiP device through a waveguide of the SiP device comprises transmitting light characterized by a first optical spot size, and wherein collimating the light comprises collimating the light to a beam having a second optical spot size, larger than the first optical spot size. Optionally, the second optical spot size is at least twice as great as the first optical spot size. Optionally, the method includes directing the collimated light into an optical fiber.

The present invention will be more fully understood from the following detailed description of the embodiments thereof, taken together with the drawings in which:

DETAILED DESCRIPTION OF EMBODIMENTS

Overview

Figure 1:
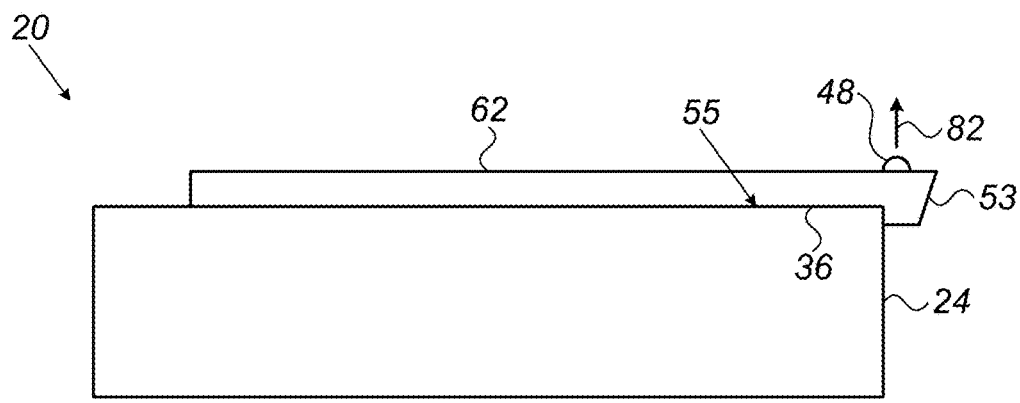
FIG. 1 is a schematic cross-section of an optical interconnection assembly, in accordance with an embodiment of the present invention.

Interconnection between Silicon Photonics (SiP) devices and external optical signal carriers is technologically challenging, because of the accuracy required for the alignment of light beams. SiP waveguides typically have a diameter on the order of 3 μm, for example between 0.1 and 3 micrometers, which makes a misalignment of even less than 1 micron very problematic.

Embodiments of the present invention that are described herein provide improved methods and apparatus for interconnecting light from waveguides of SiP devices to other optical elements.

In an aspect of some embodiments of the invention, the interconnection between the waveguides and external optical elements is performed by an optical system, separate from the SiP device, which deflects the light from the SiP device waveguides by an angle of at least 30° or even at least 60°, for example by about 90°. Optionally, the light exiting the waveguides of the SiP are in a first plane and the light is deflected into a second plane in which the light passes to an external optical element. The use of an optical deflecting system in a distinct separate element from the SiP device allows for better accuracy, as the production of each element may be adjusted according to the specific needs of each separate element. The reference to a distinct element is meant to cover elements of different materials and/or produced in different processes, even if they are attached to each other or one is produced on the other.

In some embodiments, an interconnection optical device includes collimating lenses coupled to the SiP device by the deflecting optical system. Optionally, the deflecting optical system comprises a deflection substrate in which a deflecting surface is defined. The term collimating substrate is used herein to refer to a system including a deflection substrate and collimating lenses. The collimated light can be coupled to any external optical element, such as optical fibers or another SiP device. Optionally, the collimating is achieved by an array of focusing optical elements, for example an array of micro-lenses.

By deflecting the light from the SiP waveguides by a substantial angle, the accuracy of the alignment between the SiP waveguides and the optical system, is not constrained by the numerical aperture of focusing optical elements. Instead, the accuracy of the alignment depends on the accuracy of the deflection optical system, which can be produced in a more accurate manner.

Optionally, deflecting the light from the waveguides to the lenses is performed by a 45° sloped mirror surface. Alternatively, the angle of the sloped mirror surface is selected to allow simple production in a collimating substrate, e.g., 54.7°. The angle is optionally compensated for by refraction through a refractive material having a suitable refraction index on a path between the SiP waveguides and the slope and/or between the slope and the collimating lenses.

In some embodiments, the refractive material comprises an adhesive which additionally connects the SiP device to the deflection optical system including the sloped mirror surface.

A further aspect of some embodiments of the invention relates to an optical system in which an interface between waveguides of a SiP and an external optical system comprises an optical device produced using planar semiconductor technology. The use of planar semiconductor technology allows for a higher accuracy than optical systems of molded polymer parts.

In some embodiments, the optical system coupling the SiP waveguides to the collimating lenses comprises a silicon substrate, for example a silicon wafer processed double sided to have optical features on both sides of the wafer.

The Production of optical elements in Silicon allows better handling of large numerical aperture (NA) beams originating from the SiP waveguides.

An aspect of some embodiments of the invention relates to an optical system in which waveguides of a SiP device are coupled to a connector through respective collimating lenses, without passing the light from the waveguides through optical fibers. Passing the light to the connector, without passing the light through optical fibers simplifies the structure of the optical system.

In some embodiments, the connector comprises a trough designed and shaped to receive an optical fiber ferrule and accurately hold the ferrule in a position required to align the fibers with the collimating lenses. In other embodiments, the connector is designed to attach to an external optical device in a manner aligning the collimating lenses of the device with respective collimating lenses of the external optical device.

Example Lens—Based Interconnect Configurations

FIG. 1 is a schematic cross-section of an optical interconnection assembly 20, in accordance with an embodiment of the present invention. Optical assembly 20 comprises a Silicon Photonics (SiP) device 24, defining one or more waveguides 36, connected to a silicon substrate 62, which serves to direct light from the waveguides 36 to one or more respective lenses 48. The light 82 comes out of lenses 48 collimated, such that the light 82 can be collected and directed into optical fibers and/or other optical elements. Silicon substrate comprises a slanted surface 53 which deflects light exiting from waveguides 36 to the respective lenses 48, and thus serves as a deflection substrate. It is noted that slope 53 is shown schematically and its angle in the image is not necessarily an accurate angle required for the deflection. The exiting light 82 is optionally perpendicular to waveguides 36 and/or the light exiting waveguides 36.

SiP device 24 may comprise any suitable optical components and may implement any suitable optical processing function, such as optical communication, routing or switching. Optionally, SiP device 24 does not have an internal laser or other light source, but rather receives light from an external unit. In some embodiments, SiP device 24 does not include a gain medium, such as an amplifier, and does not produce light. SiP device 24 optionally includes one or more elements which perform light processing, such as an amplitude modulator, a ring resonator and/or a light filter. Alternatively or additionally, SiP device 24 comprises one or more light multiplexers for combining light of different wavelengths, demultiplexers and/or splitters. Further alternatively or additionally, SiP device 24 comprises a light detector.

In some embodiments of the invention, silicon substrate 62 defines a groove 55 in which SiP device 24 fits. The depth of the groove 55 is optionally accurately selected such that substantially all the light from waveguides 36 is directed to slanted surface 53, from which the light is deflected to lenses 48. the depth of groove 55 is optionally less than 100 microns, optionally less than 20 microns, or even less than 10 microns, such that any inaccuracy in the depth is relatively small (e.g., less than 1 micron, or less than 0.5 microns), and does not prevent the light from being properly directed to lenses 48.

Optionally, slanted surface 53 is at an angle of 45° relative to waveguides 36, in order to direct the light to lenses 48, perpendicular to the lenses. In some embodiments, slanted surface 53 is created by etching, using any suitable method known in the art, such as the method described in Kurt E. Peterson, "Silicon as a Mechanical Material", Proceedings of the IEEE, vol. 70, No. 5, pp. 424 (1982).

SiP device 24 is optionally optically coupled to silicon substrate 62 using a suitable adhesive. Proper alignment is optionally achieved by etching in silicon substrate 62 an accurate groove to receive SiP device 24. The etching is optionally performed by a lithography step and a subsequent anisotropic etching with either a chemical solution, such as KOH (Potassium hydroxide), TMAH (Tetra Methyl Ammonium Hydroxide), EDP (Ethylene Diamine), solutions of N2H4, NaOH or CsOH, or alternatively by using Reactive Ion Etch (RIE), known as Dry Etch.

Alternatively the alignment is achieved using an accurate placement machine such as a flip chip aligner, for example the aligner provided by AMICRA Microtechnologies GmbH, Regensburg, Germany.

Alternatively or additionally, SiP device 24 is coupled to silicon substrate 62 using kinematic alignment by forming on SiP device 24 three alignment sites, for example, a pyramidal pit, a triangular trench and a plain unconstraining surface, and forming on the Silicon substrate three matching alignment elements, e.g., bumps, that accurately match the three sites on the SiP. In other embodiments, elastic averaging alignment is used, for example as described in "Precision Passive Alignment of Wafers", Alexis Christian Weber, Master of Science thesis, MIT, 2002.

Silicon substrate 62 optionally comprises a silicon with a relatively high refractive index, e.g., n=3.45. Lenses 48 optionally are polymer lenses with a refractive index of about n=1.5. Alternatively, silicon lenses are used.

Although the above description relates to light coming out of waveguides 36, interconnection assembly 20 can be used additionally or alternatively for introducing light into waveguides 36. Optionally, interconnection assembly 20 is used to pass light concurrently into a specific waveguide 36 and out of that same specific waveguide 36. For example, the light into the specific waveguide 36 may be in a first wavelength, while the light coming out of the specific waveguide is in a second wavelength, different from the first wavelength. In other embodiments, assembly 20 is used to interconnect to a plurality of waveguides 36. One or more first waveguides are used to enter light into the SiP, while one or more second waveguides are used to export light from the SiP.

Figure 2:
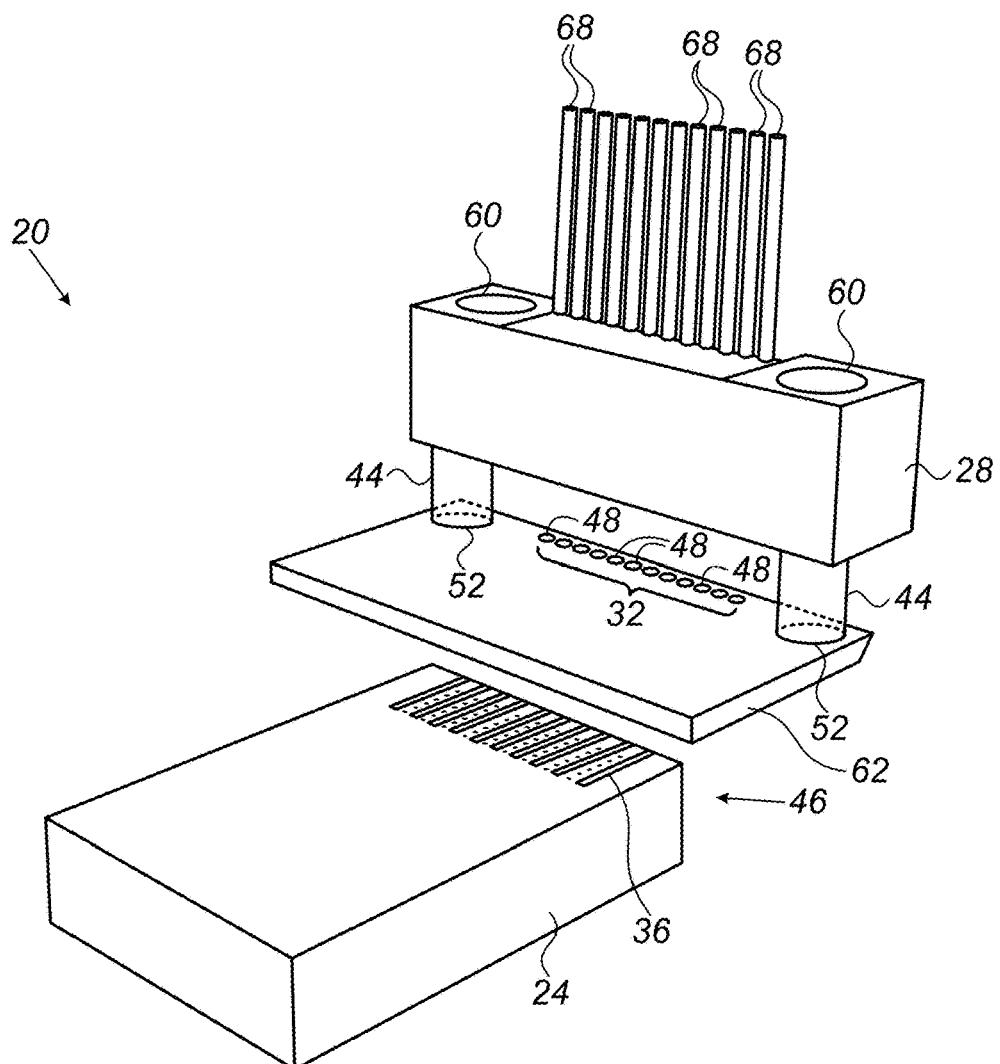
FIG. 2 is an exploded isometric view of optical interconnection assembly, along with a ferrule of optical fibers, in accordance with an embodiment of the present invention.

FIG. 2 is an exploded isometric view of optical interconnection assembly 20, along with a ferrule 28 of optical fibers 68, in accordance with an embodiment of the present invention. Assembly 20 comprises silicon Photonics (SiP) device 24, defining a plurality of waveguides 36, and silicon substrate 62 which includes a planar micro-lens array 32. In some embodiments, SiP device 24 exchanges optical signals with external devices using an array of optical waveguides 36.

In the present example, device 24 comprises 12 waveguides 36 (for simplicity of the image, FIG. 2 shows only 10 waveguides) that terminate on a certain face 46 of the device 24. Waveguides 36 may be used for transmitting optical signals out of SiP device 24 and/or for receiving signals into the SiP device.

In some embodiments, waveguides 36 have a square or rectangular cross section having a width of 3 μm (and thus an optical spot size of this order). In other embodiments, the waveguides 36 have a circular or elliptical cross-section. The width or radius of waveguides 36 is generally not greater than 3 μm, optionally smaller than 2 μm or even smaller than 1 μm. In some embodiments, width or cross section radius of waveguides 36 is smaller than 0.6 μm or even smaller than 0.3 μm.

The spacing between waveguides 36 ("pitch") in some embodiments is between 100 μm and 750 μm. The optical layers of SiP device 24 are optionally fabricated in a Silicon on Insulator (SOI) configuration. Optionally, SiP device 24 comprises silicon on a thin insulator layer (e.g., silica), which is laying on a silicon substrate. Assuming an eight-inch wafer, the substrate below the insulator layer generally has a thickness of about 720 μm. In other embodiments, the substrate below the insulator layer of SiP device 24 has a thickness smaller than 720 μm, optionally smaller than 400 μm.

Optionally, waveguides 36 are produced by defining silicon channels above the silicon base of the SiP device 24 and coating the channels with a clad material having a lower optical index than the silicon. The clad material serves to confine light waves passing in the waveguide, within the channels of the waveguides. In some embodiments of the invention, different clad layers are placed on different sides of the waveguides, and/or for different ones of waveguides 36. For example, a first clad material may be placed below the waveguides 36 and a second clad material above the waveguides. In other embodiments, the same clad material is used for the entire surroundings of each of the waveguides 36 and/or for all the waveguides. The clad material optionally includes an isolating layer of silicon Oxide or Silicon Nitride, or a combination of Oxide-nitride. In some embodiments, the clad material comprises a separate solid layer.

As shown in FIG. 2, assembly 20 may be coupled to a ferrule 28 of optical fibers 68. Methods of coupling assembly 20 to ferrule 28 are described further herein below with reference to FIGS. 5 and 6. In some embodiments, lens array 32 comprises a plurality of micro-lenses 48, each designed to collimate the light of a corresponding waveguide 36. Depending on the pitch of waveguides 36, micro-lenses 48 are spaced from one another, so as to match the pitch of waveguides 36 (e.g., between 100 μm to 750 μm) and fibers 68. Alternatively, pitches lower than 100 μm or larger than 750 μm are used. The use of relatively larger pitches, e.g., larger than 250 μm, allows use of larger lenses, and allows an even more relaxed alignment between lens arrays 32 and corresponding lenses in ferrule 28.

Figure 5A:
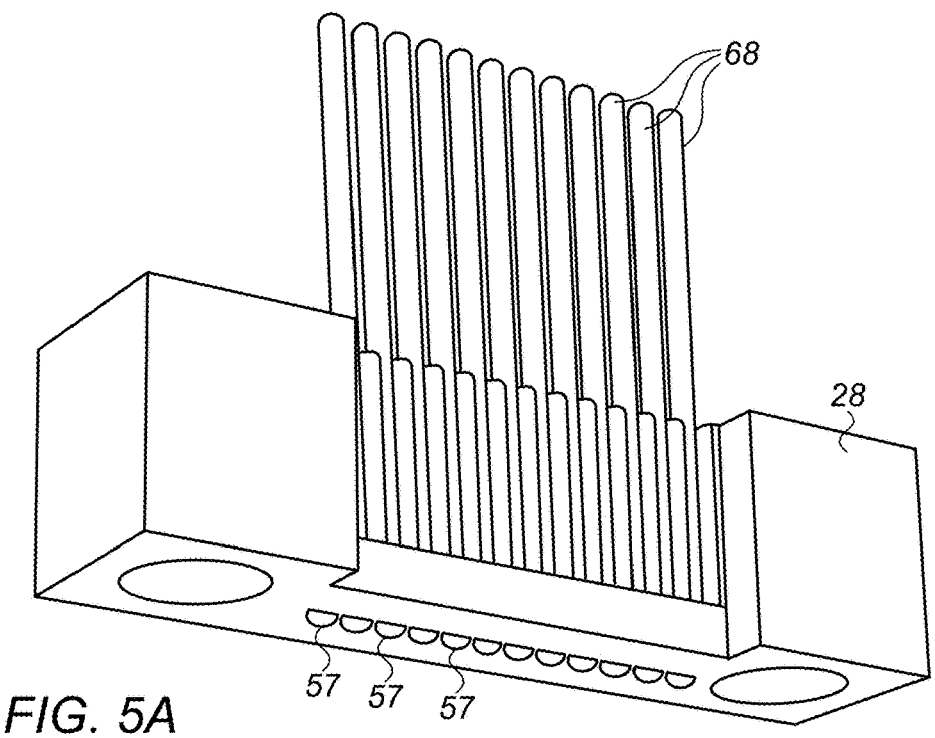
FIG. 5A is a schematic illustration of a ferrule, in accordance with an embodiment of the invention.

Single-mode optical fibers typically have a core diameter on the order of 9 μm, and optical ferrules typically have a fiber-to-fiber pitch on the order of 250 μm. When interconnecting optical waveguides 36 of a SiP device 24 to respective optical fibers, the differences in diameter are optionally bridged by the lenses 48 and corresponding collimating lenses 57 in ferrule 28 (FIG. 5A).

Any suitable micro-lens technology can be used for manufacturing micro-lenses 48. In some embodiments, lenses 48 are spherical silicon and/or polymer lenses. Alternatively, lenses 48 comprise Fresnel lenses or Fresnel zone plate lenses. The lenses 48 are formed using any suitable method known in the art. Spherical lenses are optionally produced by lithography, thermal reflow and subsequently lens pattern transfer to a Silicon substrate by Reactive Ion Etching. Fresnel zone plate lenses are optionally produced by lithography and subsequent dry anisotropic RIE etching. Alternatively, micro-lenses 48 are produced by use of high contrast meta-structures, for example, as described by A. Arbabi et al., "Efficient High NA flat micro-lenses realized using high contrast transmit arrays", Proc. of SPIE Vol. 9372, 93720P-1, 2015.

It is noted that the collimated light 82 from lenses 48 eases alignment tolerances between SiP device 24 and ferrule 28 of optical fibers 68, such that the alignment between substrate 62 and ferrule 28 requires a much lower accuracy than in arrangements of the prior art.

Lenses 48 are optionally coated with a suitable anti-reflective coating that allows efficient light transfer from the lens material to the air and vice versa. In some embodiments, for example when lenses 48 are polymer lenses, an anti-reflective coating is also applied between Silicon substrate 62 and the lenses 48.

Similarly, the surface of substrate 62 facing SiP device 24 is optionally coated with an anti-reflective coating that allows efficient light transfer of light.

It is noted that in some embodiments, substrate 62 does not include lenses 48, and instead lenses of an external device are relied upon to direct the deflected light into fibers of ferrule 28 or other external devices.

It is also noted that in some embodiments, ferrule 28 does not include lenses 57, and instead lenses 48 are relied upon to direct the deflected light into fibers of ferrule 28 or into other external devices.

Optionally, precision assembly is applied in assembling substrate 62 on SiP device 24 by any suitable method known in the art, such as those described above. Likewise, in ferrule 28 of optical fibers 68, fibers 68 are optionally aligned to a lens array (e.g., lenses 57 in FIG. 5A) which is part of ferrule 28, with a precision equivalent to a core size of the fibers. For example, for a 9 µm core, an alignment precision of about 1 to 3 µm is optionally used. Optionally, this alignment precision is provided by the ferrule structure itself, and the mounting of the fibers into the ferrule grooves aligns the fibers to the lenses 57 with the necessary accuracy. This is optionally achieved by creating the lenses 57 as part of the ferrule and defining the grooves in the ferrule, although any other suitable ferrule construction method known in the art may be used.

In contrast, the collimated light provided from assembly 20 by lenses 48 allows efficient coupling between assembly 20 and ferrule 28, even at relatively large offsets between lens arrays 32 and fibers 68, for example up to and offset of 10 to 20 µm.

The collimated nature of the beam provides these lessened alignment tolerances. A collimated light incident onto any portion of a lens will be focused to its focal spot. An offset between lenses array 32 and a lens array of ferrule 28 will offset the collimated light incident from the source lens onto the target lens, but this portion of light will still be directed to the focal spot.

Accordingly, interconnection assembly 20 may be designed to operate as a connector allowing users to connect and disconnect ferrule 28, as required. Alternatively, ferrule 28 may be attached permanently to assembly 20.

Ferrule 28 comprises in some embodiments, a non-transparent material, such as Bakelite. In other embodiments, ferrule 28 comprises light transparent materials, such as PMMA, ULTEM (polyethermide), glass, or other polymer, or any other suitable material. In some embodiments, the material of ferrule 28 is sufficiently rigid to provide accurate relative location of fibers 68. The optical fibers optionally leave the ferrule bundled in an optical cable. Fibers 68 may comprise, for example, SMF-28 fibers.

The spacing between fibers 68, i.e., the pitch of ferrule 28, is optionally 250 µm. In the present embodiment, the core diameter of fibers 68 is 9 µm (and the fibers' optical spot size is of this order).

In order to connect waveguides 36 to fibers 68, the differences in optical spot size (3 µm (or less) vs. 9 µm) and in pitch (750 µm vs. 250 µm) should be bridged. In some embodiments, the pitch difference is bridged by populating only a subset of fiber locations of ferrule 28 with fibers. In an example embodiment, the ferrule comprises only four fibers fitted in the second, fifth, eights and eleventh positions (out of the twelve possible positions). This configuration produces an actual pitch of 750 µm between the four fibers. This pitch will match an embodiment where the waveguides 36 on the SiP 24 are arranged with a 750 µm pitch.

In the present embodiment, when assembling assembly 20, micro-lens array 32 and ferrule 28 are aligned to one another using alignment pins 44. Pins 44 are fit into respective locations 52 on silicon substrate 62, and then fit into alignment holes 60 on ferrule 28.

In alternative embodiments, any other suitable attachment and alignment means can be used instead of guide pins 44. For example, silicon substrate 62 and ferrule 28 may be attached to a suitable flange or base-plate (e.g., glued to a common glass bar). A suitable curing process, e.g., heat or Ultra-Violet (UV) curing, can be used for gluing the silicon substrate and ferrule to the common glass support.

In some embodiments, silicon substrate 62 is embedded in ferrule 28. In alternative embodiments, silicon substrate 62 and ferrule 28 are separate modules that are connected to one another during manufacturing of assembly 20. In still other embodiments, ferrule 28 is removably attachable to assembly 20, such that silicon substrate 62 serves as a connector for removable coupling of ferrules to SiP device 24.

Figure 3:
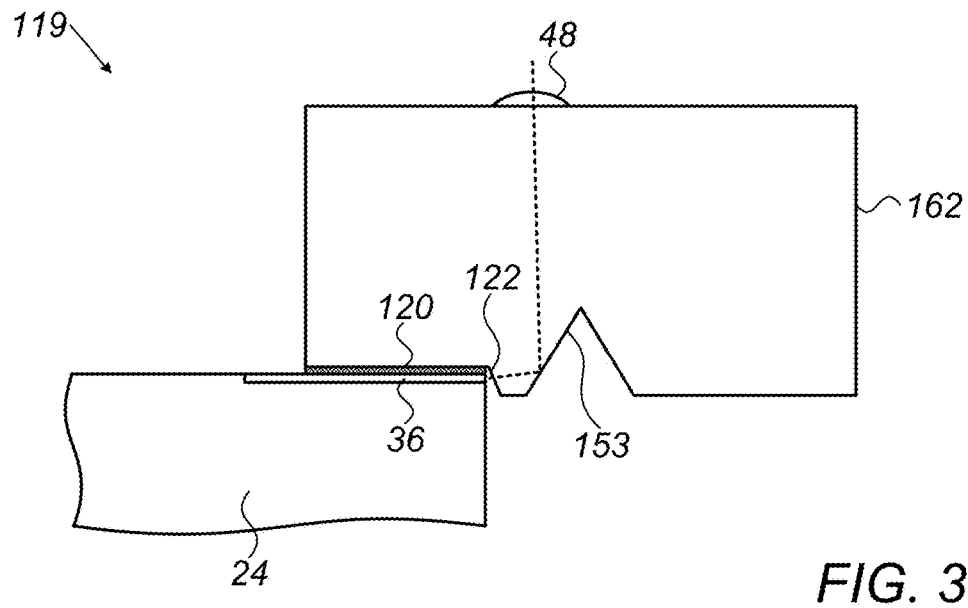
FIG. 3 is a schematic cross-section view of an optical interconnection assembly, in accordance with another embodiment of the present invention.

FIG. 3 is a schematic cross-section view of an optical interconnection assembly 119, in accordance with another embodiment of the present invention. Optical assembly 119 comprises a Silicon Photonics (SiP) device 24 and a silicon substrate 162 coupled to SiP device 24. Silicon substrate 162 is similar to silicon substrate 62, but differs in illustrating that a sloped surface 153 for directing light from waveguides 36 to lenses 48 does not necessarily span over the entire thickness of the silicon substrate, but rather may be formed in cutting a groove in substrate 162.

Figure 4:
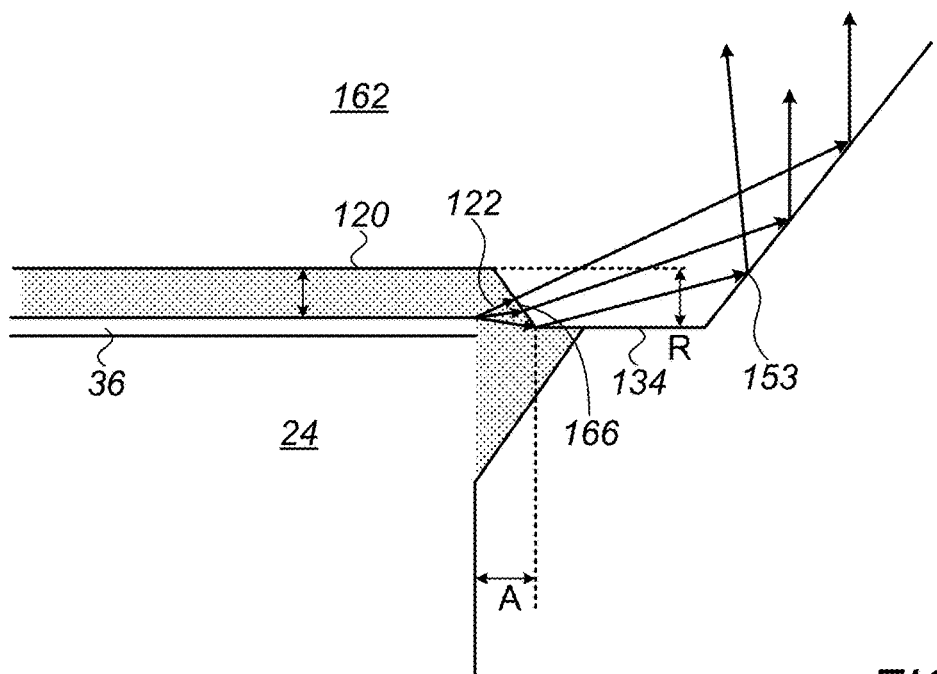
FIG. 4 is a schematic expanded cross-section view of the connection between a SiP device and a collimating substrate, in accordance with an exemplary embodiment of the invention.

FIG. 4 is a schematic expanded cross-section view of the connection between SiP device 24 and silicon substrate 162, in accordance with an exemplary embodiment of the invention. Silicon substrate 162 is designed to have a groove 55 (FIG. 1) which receives an optical transparent adhesive 120 and 122 and SiP device 24. The adhesive 120 does not fill the entire groove 55, leaving room for a portion of SiP device 24, including waveguides 36, so that light from the waveguides is directed through adhesive layer rim 122, to a lower tongue 134 of silicon substrate 162 to sloped surface 153.

In the embodiment of FIG. 4, sloped surface 153 has an angle which differs from 45° and the difference in the angle is compensated by the refraction of light passing between the optical adhesive 122 and silicon substrate 162. Optionally, adhesive layer rim 122 has a sloped surface 166 on the side facing waveguides 36, such that light passing from the waveguides through the optical adhesive 122 is refracted to compensate for the difference between the angle of sloped surface 153 and 45° while the light ray crosses sloped surface 166 and is reflected by surface 153.

In some embodiments, surface 46 (FIG. 2) is perpendicular to waveguides 36. In other embodiments, surface 46 (FIG. 2) is sloped, e.g., by 7 to 8 degrees off a perpendicular axis. In this case, the refractive index of the adhesive in layer rim 122 is selected such that light passing from the waveguides through the optical adhesive 122 is refracted to compensate for the difference between the angle of sloped surface 153 and 45° and the slope of surface 46, while the light ray crosses sloped surfaces 46 and 166 and is reflected by surface 153.

Optionally, sloped surface 166 has the same angle as sloped surface 153. The angle of sloped surface 153 is optionally selected as an angle easy to produce in silicon substrate 162, such as 54.74°. Optionally, the refractive values of silicon substrate 162 and/or optical adhesive 122 are selected to compensate for the slope angle of slope 153 and direct the light vertically towards lenses 48. Optionally, for a refractive number of 3.481 for silicon substrate 162 at 1550 nanometers, an adhesive with a refractive number of about 1.65 (e.g., between 1.645-1.655) for light at 1550 nanometers is used.

Slope 153 and adhesive 122 are optionally designed for light of a specific wavelength for which it is intended to be used (e.g., 1550 nanometers). Alternatively or additionally, substrate 162 is designed for use with a range of wavelengths, by selecting values matching a central wavelength of the range.

Optionally, one or more surfaces of silicon substrate 162 are coated with a suitable anti-reflective coating for ensuring efficient light passage through the Silicon to adhesive 122 and/or lenses 48.

In embodiments, an additional high-accuracy alignment is performed between silicon substrate 62 or 162 and SiP device 24, in order to minimize optical loss in the waveguide-fiber interface. In some embodiments, the face of the SiP device is marked (typically etched) with alignment marks. The alignment marks are positioned, at corresponding locations on bottom or top surfaces of substrate 62 or 162 and SiP device 24. During assembly, these alignment marks can be used for aligning substrate 62 or 162 and SiP device 24 using automatic optical alignment.

In some embodiments, silicon substrate 62 or 162 comprises a double sided processed silicon wafer to have optical features on both sides of the wafer. For example, as can be seen in FIG. 3, the top of the substrate 162 carries a refractive lens 48, while the bottom of substrate 162 defines groove 55 and sloped surface 153. Alternatively, silicon substrate 62 or 162 is a one-side processed wafer, with lenses 48 being added on separately from the silicon processing.

FIG. 5A is a schematic illustration of a ferrule 28, in accordance with an embodiment of the invention. In the embodiment of FIG. 5A, ferrule 28 comprises a plurality of spherical lenses 57, which direct the collimated light from silicon substrate 62 or 162 into fibers 68.

Lenses 57 optionally comprise refractive lenses molded within ferrule 28, such that the lenses 57 are exactly aligned to a set of V grooves that are used to hold the fibers 68. In this case the ends of the fibers 68 are optionally positioned exactly at the focus of the spherical lenses.

Figure 5B:
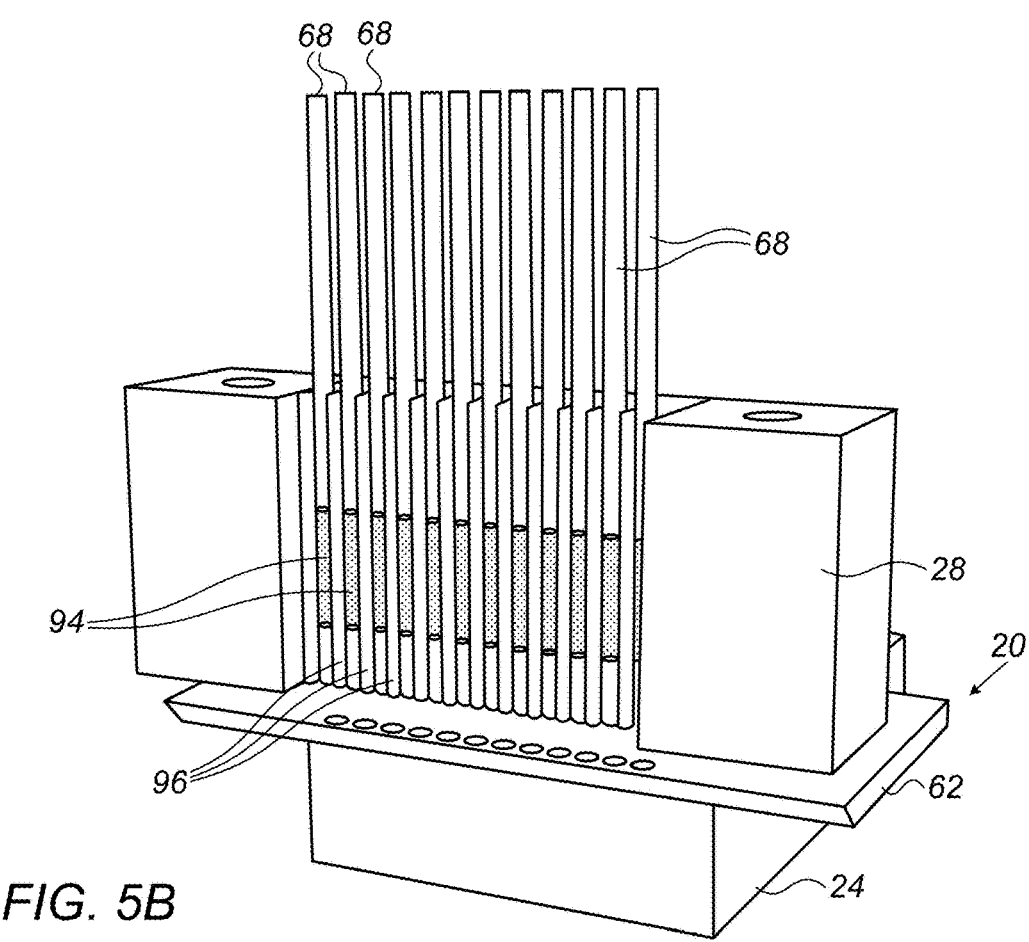
FIG. 5B is a schematic illustration of a ferrule and an optical assembly, in accordance with another embodiment of the invention.

FIG. 5B is a schematic illustration of ferrule 28, and assembly 20, in accordance with another embodiment of the invention. In the embodiment of FIG. 5B, instead of lenses 57 as in the embodiment of FIG. 5A, ferrule 28 comprises Graded Index (GRIN) lenses made of Multi-Mode Fibers (MMF). Optionally, the GRIN lenses are placed on a same groove that holds the fibers. The length of the GRIN lens is designed to accurately collimate the light coming from the fibers into the lens and vice versa.

In one embodiment, each fiber 68 is coupled to a respective single GRIN lens. In other embodiments, each fiber 68 is coupled to a plurality of cascaded GRIN lenses. In FIG. 5B, each fiber 68 is coupled to a first GRIN lens 94 and a second GRIN lens 96.

Figure 6:
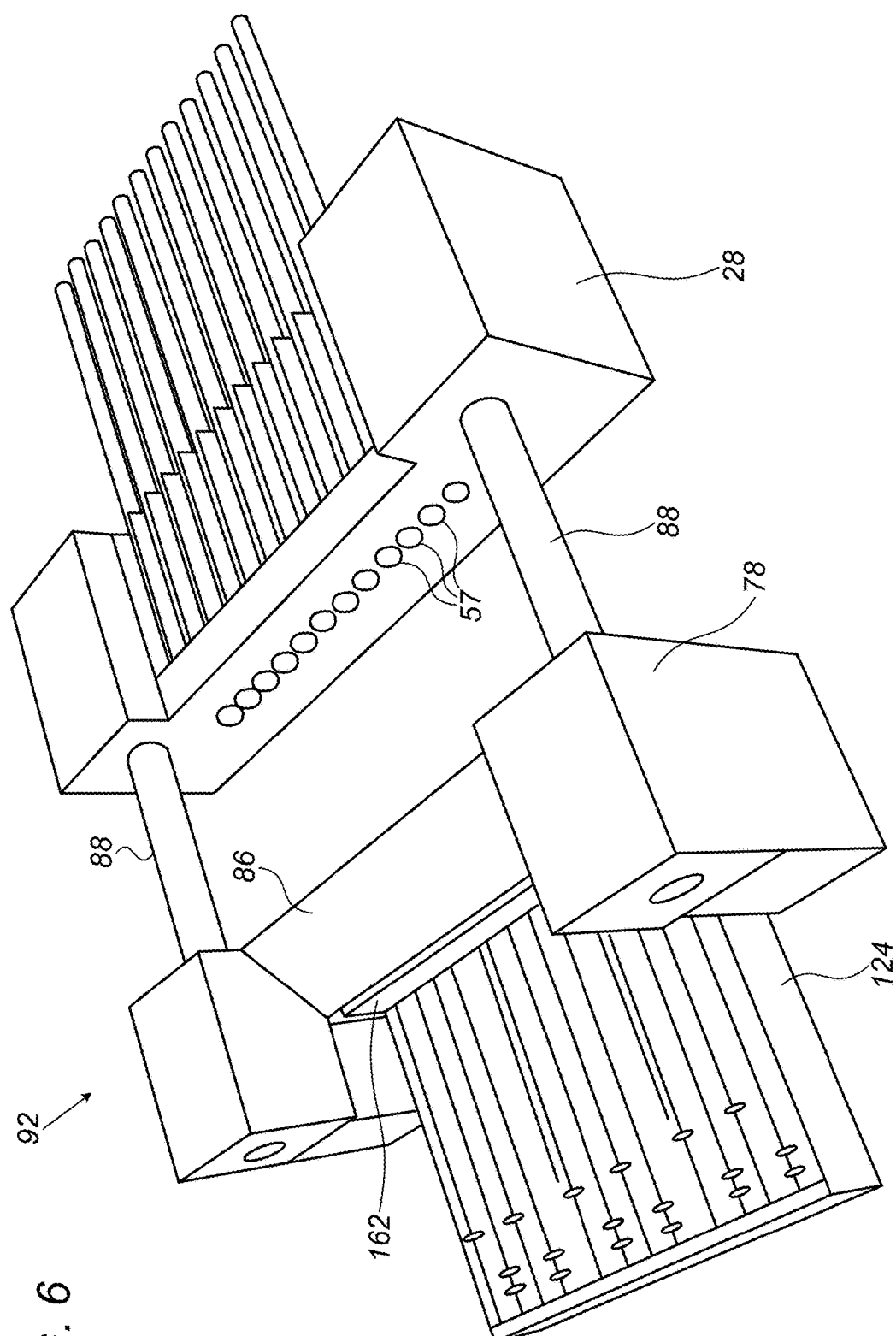
FIG. 6 is a schematic illustration of a horizontal ferrule and an optical assembly, in accordance with another embodiment of the invention.

FIG. 6 is a schematic illustration of an optical assembly 92 connecting a SiP substrate 124 to a ferrule in a horizontal orientation, in accordance with another embodiment of the invention. In the embodiment of FIG. 6, lenses 57 are not orthogonal to substrate 24 as in the embodiment of FIG. 5A, but rather, lenses 57 lie on a plane parallel to the surface of SiP substrate 124. In addition to silicon substrate 162 and lenses 48 (hidden in FIG. 6, can be seen in FIG. 3), assembly 92 includes a mirror unit 78, including a mirror 86 at a 45° angle, which directs light from lenses 48 to ferrule 28. Two pins 88 attached to mirror unit 78 align ferrule 28 and mirror 86.

Figure 7:
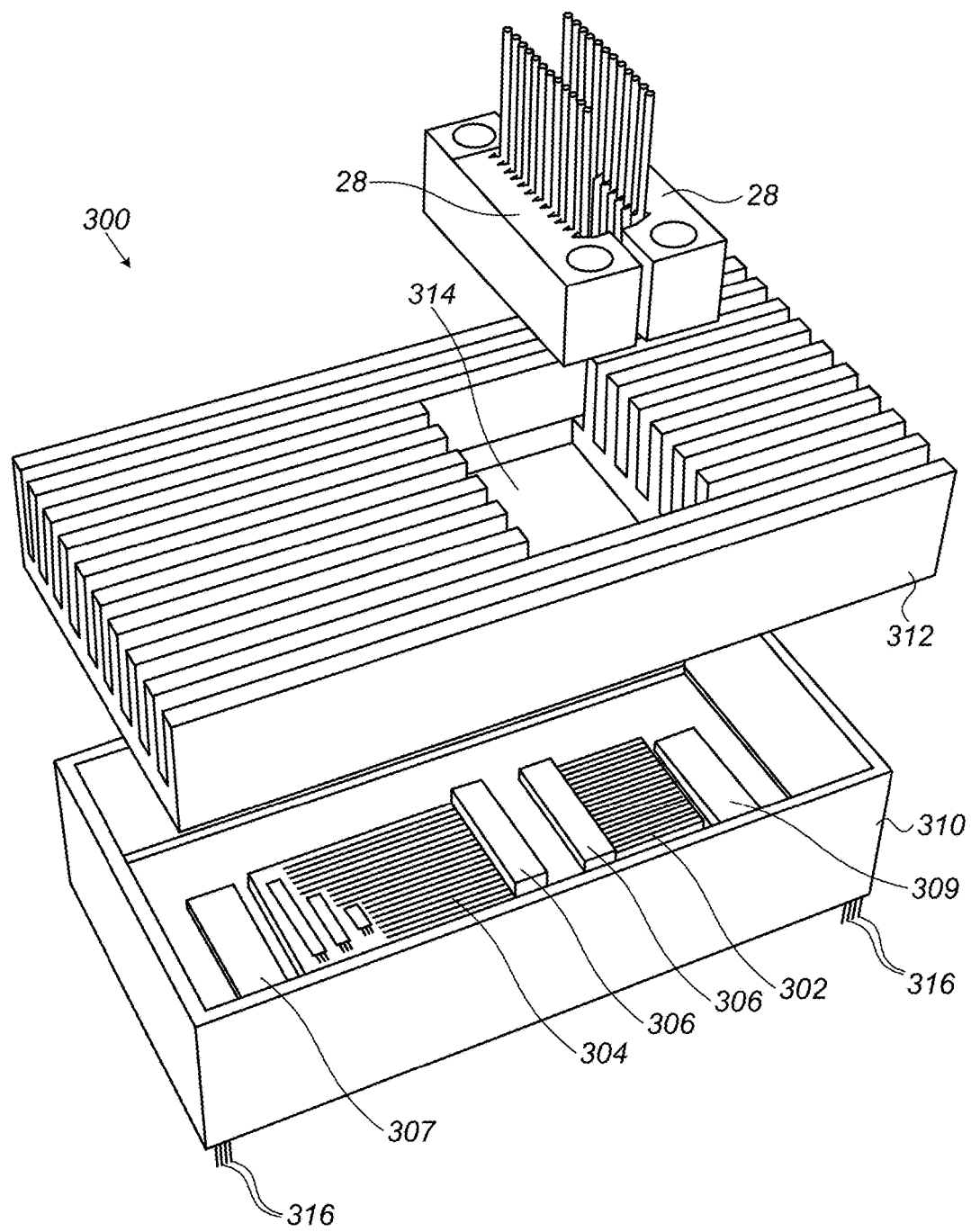
FIG. 7 is a schematic exploded view of a SiP collimator, in accordance with an embodiment of the invention.

FIG. 7 is a schematic exploded view of a SiP data module 300, in accordance with an embodiment of the invention. SiP data module 300 comprises first and second SiP devices 302 and 304, for example a transmitter SiP device and a receiver SiP device. Each SiP device 302 and 304 has a respective silicon substrate 306, which converts light from within waveguides in the SiP device into a vertical collimated light beam. Electronic elements 307 and 309 provide electronic features for control and signal generation to and from the SiP devices 302 and 304 respectively. Electrical connectors 316 are used to connect electronic elements 307 and 309 to external electrical devices, as is known in the art.

SiP devices 302 and 304 are optionally included in a casing 310, which receives a cooling unit 312. Cooling unit 312 defines an aperture 314 serving as a receptacle configured to receive a pair of ferrules 28 in positions such that their fibers are aligned with the collimated light from lenses 48.

In some further embodiments, two or more different SiP devices communicate through a collimated light beam with each other, and transmit and receive optical pulses between them. A high frequency stream of data can be transmitted through free space between two separate locations, such as two different Printed circuit boards, or between an enclosure and an external non-contact data access port.

Figure 8:
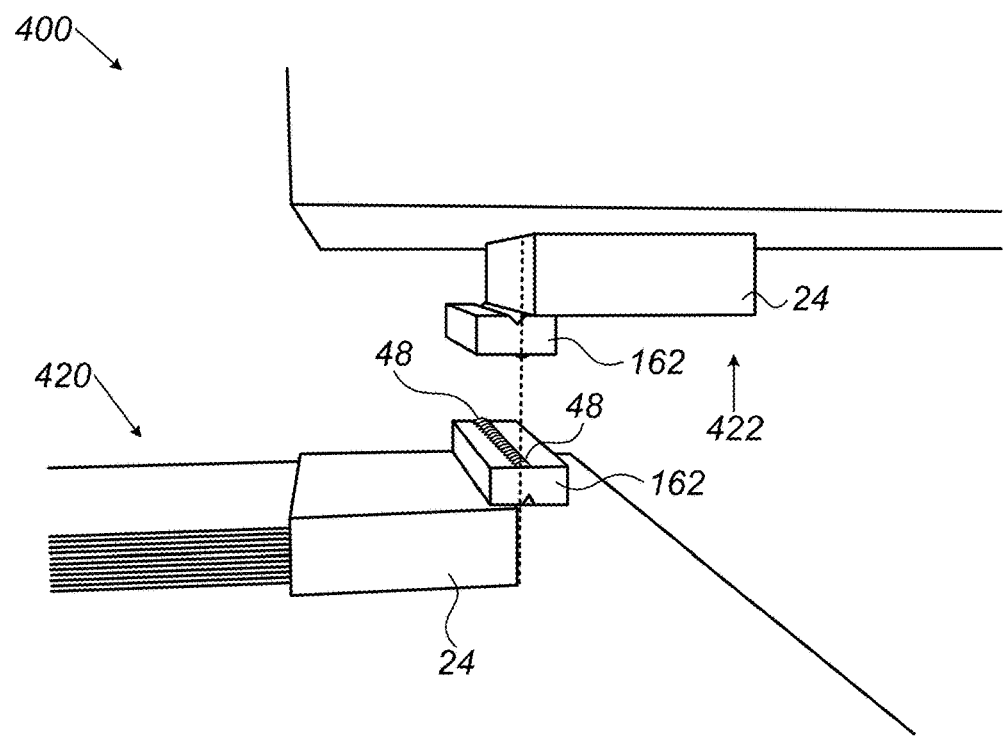
FIG. 8 is a schematic illustration of a pair of optical assemblies, which exchange optical signals, in accordance with an embodiment of the invention.

FIG. 8 is a schematic illustration of an arrangement 400 of a pair of optical assemblies 420 and 422, which exchange optical signals, in accordance with an embodiment of the invention. Each optical assembly 420 and 422 comprises a SiP device 24 for processing optical signals, conversion between optical and electrical signals and/or electrical signal processing. In order to export optical signals, each of optical assemblies 420 and 422 has a silicon substrate 162 which collimates light from the waveguides of the SiP device 24.

In the embodiment of FIG. 8, the collimated beams from the silicon substrates 162, exiting through lenses 48 are directed at each other, allowing the SiP devices 24 to exchange optical signals.

As shown, the collimated light from the SiP device 24 is perpendicular to the surface of the SiP device. It is noted, however, that in other embodiments, the collimated light is at a different angle relative to the SiP device 24.

Figure 9:
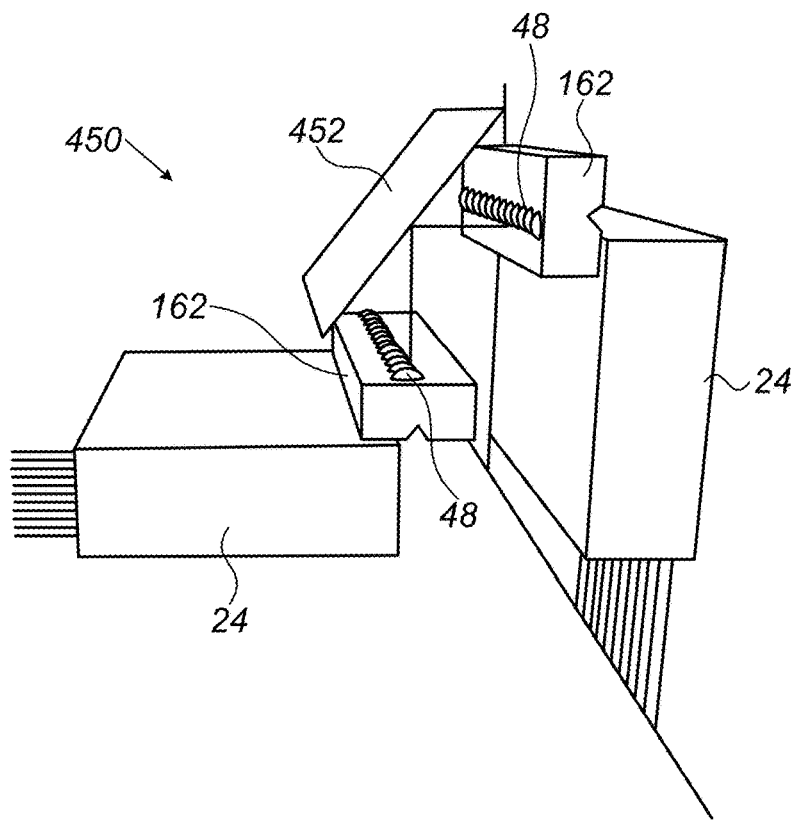
FIG. 9 is a schematic view of a pair of SiP devices which communicate through respective collimating substrates, in accordance with an exemplary embodiment of the invention.

FIG. 9 is a schematic view of an optical arrangement 450, in which a pair of SiP devices 24 communicate through respective silicon substrates 162, their lenses 48 and a mirror 452.

Figure 10:
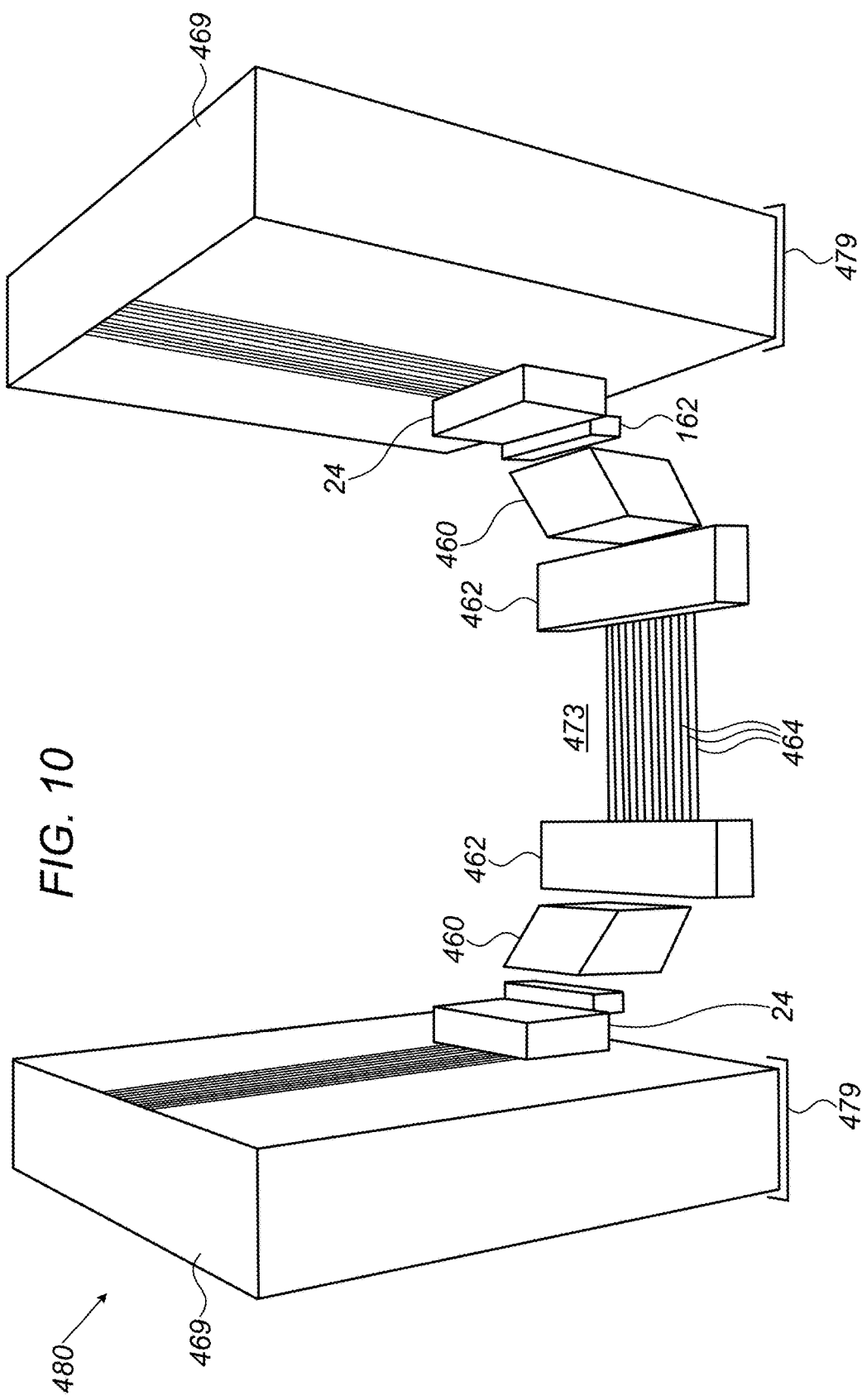
FIG. 10 is a schematic view of a pair of SiP devices which communicate through respective collimating substrates, in accordance with another exemplary embodiment of the invention.

FIG. 10 is a schematic view of an optical arrangement 480, in which a pair of SiP devices 24 communicate through fibers 464, in accordance with an embodiment of the invention. Each SiP device 24 has a respective silicon substrate 162, which collimates the light from the SiP device and passes it through a prism 460 to a ferrule 462, which directs the collimated light into fibers 464. Using the optical arrangement 480, light signals can be exchanged between SiP devices 24 over large distances, for example over a meter, over 10 meters or even over 100 meters, through fibers 464.

In other embodiments, ferrules 462 and fibers 464 are located on a backplane 473, which detachably receives electrical cards 469, for example in receptacles 479. Cards 469, when inserted into the backplane 473, are communicatively connected through SiP devices 24 and fibers 464.

Although in the above description each SiP device 24 has only a single silicon substrate 62 or 162, in some embodiments of the invention, a SiP device 24 may have two or more, possibly three, four or even more, silicon substrates 62 or 162 coupled thereto, allowing optical communications from different parts of the SiP 24 to different directions.

In addition, in some embodiments, a single collimating substrate may be used to collimate light from a plurality of SiP devices 24.

Figure 11:
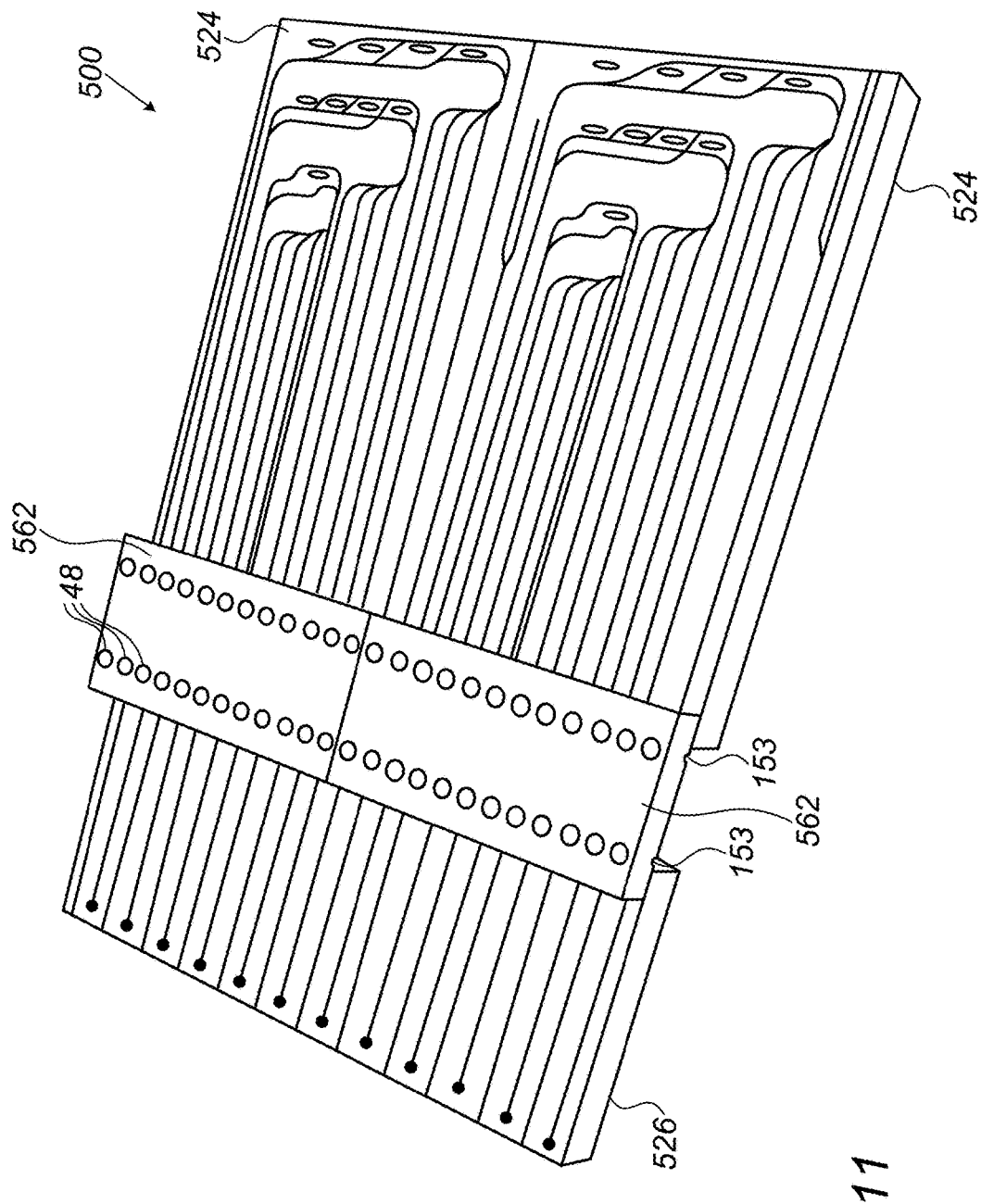
FIG. 11 is a schematic illustration of an optical arrangement in which collimating substrates service multiple SiP devices, in accordance with an embodiment of the invention.

FIG. 11 is a schematic illustration of an optical arrangement 500 in which collimating substrates 562 include two rows of lenses 48 and respective deflecting surfaces 153, which collimate light from two different SiP devices 524 and 526. FIG. 11 further illustrates that two collimating substrates 562 can be used to collimate light from a single SiP 526.

Although in the above description substrates 62 and 162 are described as being silicon substrates, other materials transparent to the wavelengths selected for the SiP communication, may be used instead of silicon. Such transparent materials may include, for example, plastic materials, Germanium, Sapphire, Glass, fused Silica and a multiplicity of other organic and inorganic materials.

Figure 12:
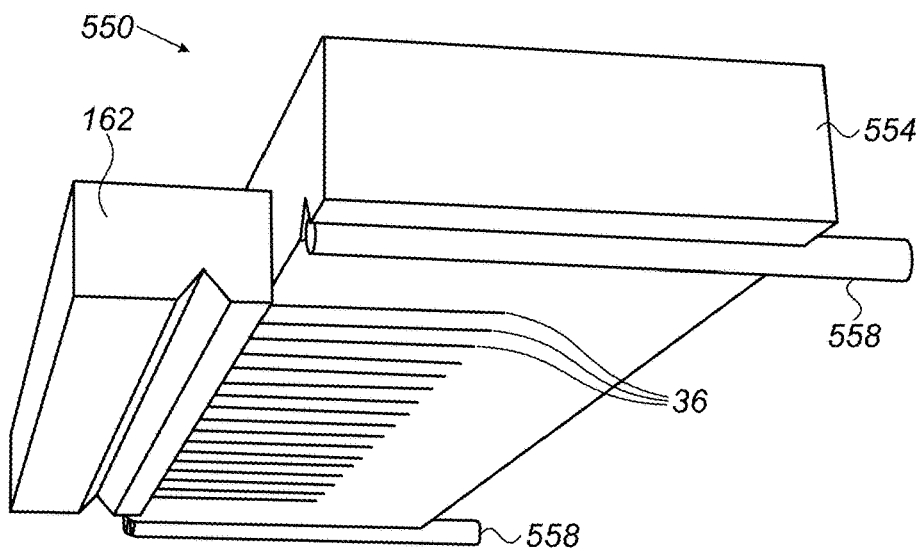
FIG. 12 is a schematic view of an optical interconnection assembly, in accordance with another embodiment of the present invention.

FIG. 12 is a schematic view of an optical interconnection assembly 550, in accordance with another embodiment of the present invention. In assembly 550, waveguides 36 are defined on the lower surface of a SiP device 554. Accordingly, collimating substrate 162 is located at a level of, or slightly below, the lower surface of SiP device 554. In some embodiments, SiP device 554 and collimating substrate 162 are located on a same flat surface (not shown). Optionally, to achieve height alignment, SiP device 554 rests on a pair of spacers 558, for example optical fibers. The embodiment of FIG. 12 is particularly useful for a flip chip arrangement.

Figure 13:
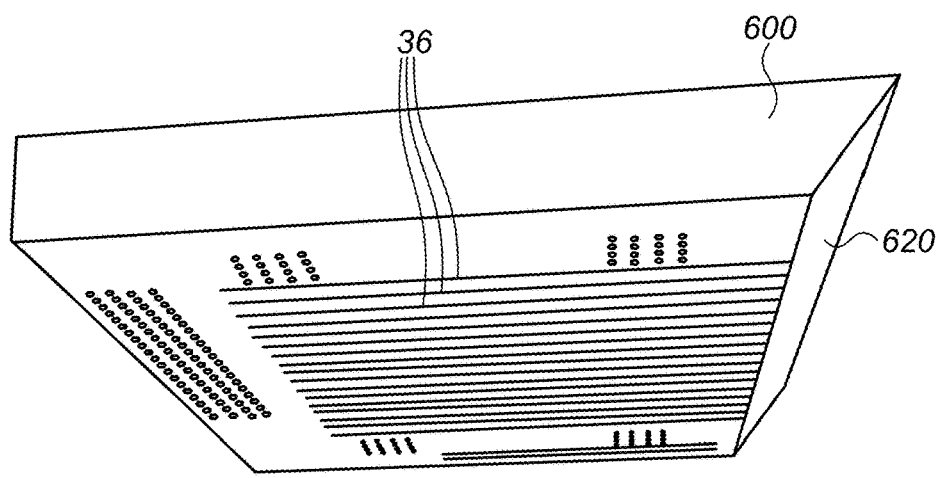
FIG. 13 is a view of a lower side of an integrated SiP and collimation substrate, in accordance with an embodiment of the invention.
Figure 14:
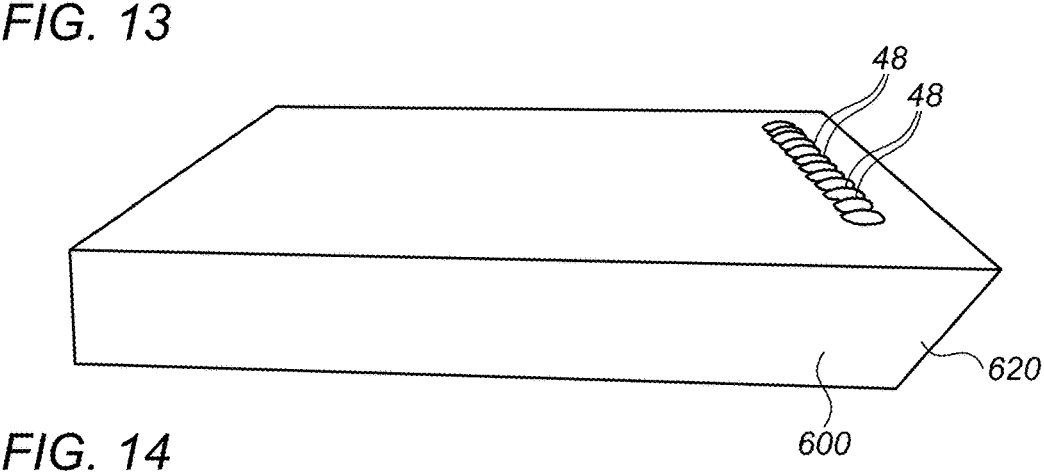
FIG. 14 is a top view of the integrated SiP and collimation substrate, of FIG. 13.

FIGS. 13 and 14 illustrate an integrated SiP and collimation substrate 600, in accordance with another embodiment of the invention. Integrated substrate 600 comprises waveguides 36 of a SiP, which direct light to a sloped surface 620, serving as a mirror. Sloped surface 620 is designed to deflect light from waveguides 36 to collimating lenses 48 on an upper surface of integrated substrate 600. Lenses 48 may be defined integrally as part of substrate 600 or may be attached thereon.

Sloped surface 620 may be as in any of the above described embodiments of the sloped surface in substrates 62 and/or 162, but differs in that sloped surface 620 is an integral part of integrated substrate 600. Particularly, in some embodiments, sloped surface 620 is at a 45° angle relative to waveguides 36 and the beam axis of lenses 48. In other embodiments, sloped surface 620 is at a different angle relative to waveguides 36. Optionally, in these embodiments, a light deflection material is injected into substrate 600 between waveguides 36 and sloped surface 620 and/or between sloped surface 620 and lenses 48 to compensate for the different angle of sloped surface 620. Optionally, a ditch is etched into the substrate and filled with a material having a suitable refractive index.

Figure 15:
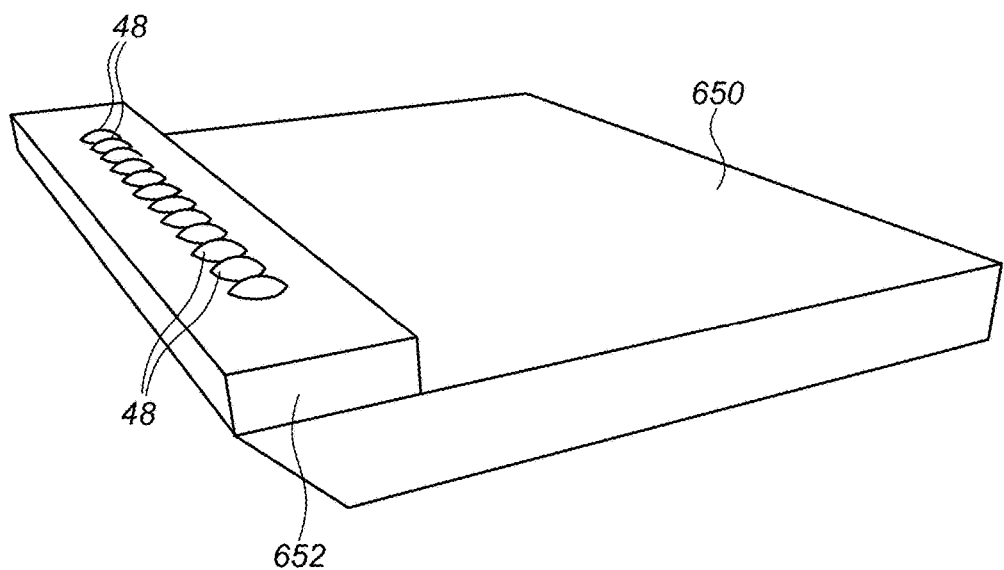
FIG. 15 is a top view of a view of an integrated SiP and collimation substrate, in accordance with another embodiment of the invention.

FIG. 15 illustrates an integrated SiP and collimation substrate 650, in accordance with another embodiment of the invention. In collimation substrate 650, lenses are not placed directly on integrated substrate 650, but rather are placed on a raised board 652.

Figure 16:
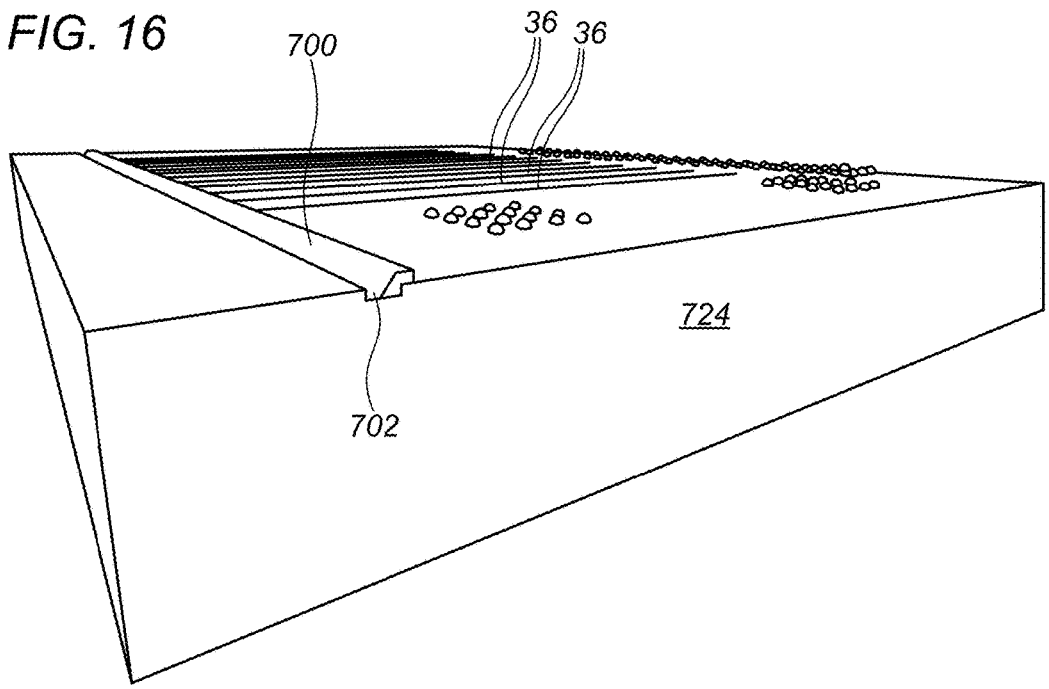
FIG. 16 is a schematic illustration of a SiP device and a corresponding separate deflection element, in accordance with another embodiment of the invention.

FIG. 16 illustrates a SiP 724 and corresponding separate deflection element 700, in accordance with another embodiment of the invention.

Figure 17:
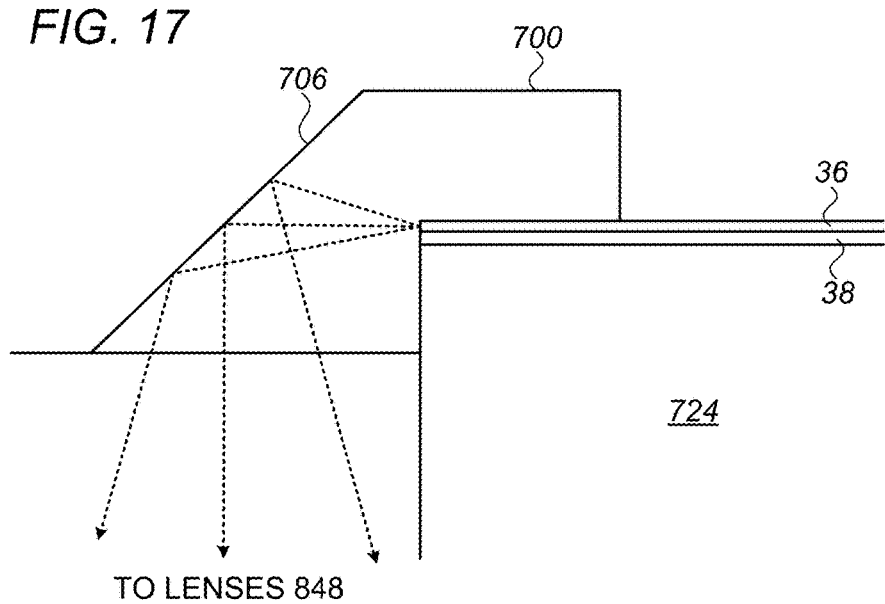
FIG. 17 is a schematic enlarged side view of a SiP device and a corresponding separate deflection element, in accordance with the embodiment of FIG. 16.

FIG. 17 is a schematic enlarged side view of SiP 724 and corresponding separate deflection element 700, in accordance with the embodiment of FIG. 16.

SiP 724 comprises waveguides 36 deposited on an upper side of SiP 724. Optionally, an isolating layer 38 separates waveguides 36 from SiP 724.

As shown in FIG. 16, a channel 702 is defined in SiP 724 at ends of waveguides 36, to allow light exiting waveguides 36 to be dispersed evenly in all directions. A deflection element 700, separate from SiP 724 is designed with a step shape to fit partially in channel 702 and partially over ends of waveguides 36 adjacent channel 702, but outside the channel. On an opposite end of the step, fitting on waveguides 36, deflection element 700 defines a slanted mirroring surface 706, which deflects light from waveguides 36 downwards towards collimating lenses (not shown).

In some embodiments of the invention, deflection element 700, including mirroring surface 706, is produced by lithography. Optionally, deflection element 700 comprises a photoresist, such as Poly (methyl methacrylate) (PMMA), Poly (methyl glutarimide) (PMGI), Phenol formaldehyde resin (DNQ/Novolac) or SU-8 OSTE Polymers, deposited over SiP 24. Deflection element 700 is then shaped by exposing the photoresist layer to light at an angle, to define a 45° mirroring surface 706.

Light from and to waveguides 36 is directed via mirroring surface 706 to lenses on a bottom surface of substrate 700, which cannot be seen in FIG. 16.

Figure 18A:
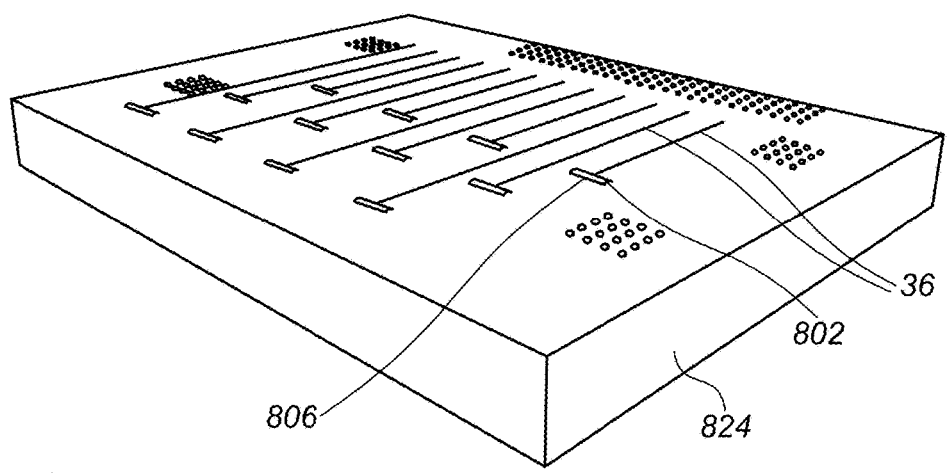
FIGS. 18A and 18B are schematic upper and lower views, respectively, of a SiP device, in accordance with another embodiment of the invention.
Figure 18B:
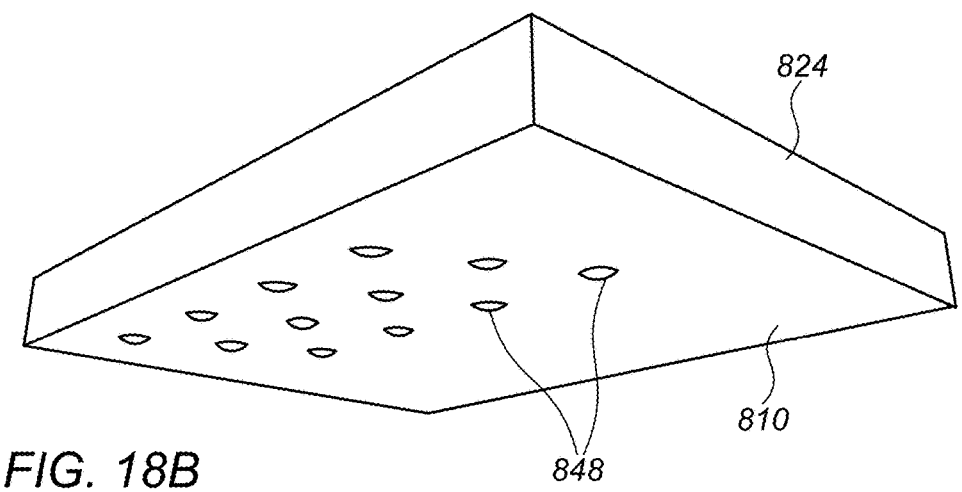

FIGS. 18A and 18B are schematic upper and lower views, respectively, of a SiP device 824, in accordance with another embodiment of the invention. SiP device 824 is similar to SiP device 724 of FIG. 16, but rather than having a single channel 702, has a plurality of separate trenches 802 and corresponding inclined mirrors 806, for directing the light from waveguides 36 to respective lenses 848 on the lower surface 810 of SiP device 824. As shown, each waveguide 36 has a separate respective trench 802 and corresponding inclined mirror 806. In other embodiments, SiP device 824 comprises a plurality of trenches 802 and respective inclined mirrors 806, with one or more of the trenches 802 being defined for a pair of waveguides 36, or for a group of three or more waveguides. In this embodiment, all the trenches 802 may be multi-waveguide trenches or one or more first trenches are multi-waveguide trenches, while one or more second trenches are single waveguide trenches. In still other embodiments, one or more single trenches 802 are defined for a plurality of respective waveguides 36, but each waveguide has a separate respective inclined mirror 806.

The use of separate trenches 802 and separate inclined mirrors 806, allows a wider distribution of lenses 848 over the lower surface of SiP device 824, allowing for a larger number of lenses 848 a hence inputs/outputs, and/or use of larger lenses, than if all the lenses were arranged along a single straight line. Trenches 802 and lenses 848 are distributed in either a randomized or ordered array of 1, 2 or more rows.

In some embodiments of the invention, lenses 848 have a diameter of about 240 microns. In other embodiments, larger lenses are used, for example having a diameter greater than 480 microns, greater than 700 microns, or even greater than 1000 microns.

SiP device 824 may have eight waveguides 36 and respective lenses, which together serve as interfaces. For example, SiP device 824 may have four input interfaces and four output interfaces. In other embodiments, SiP device 824 has fewer interfaces, or a greater number of interfaces. Particularly, by arranging lenses 848 in a plurality of rows, SiP device 824 may have more than 20, more than 30 or even more than 50 interfaces.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Optical apparatus, comprising:
    a Silicon Photonics (SiP) device, which comprises multiple optical waveguides;
    an array of collimating lenses, configured to collimate light of the multiple optical waveguides into collimated beams; and
    a deflection element, distinct from the SiP device, placed on a surface of the SiP device, including a light deflection surface which deflects light from the waveguides by an angle greater than 30 degrees, to the array of collimating lenses.

2. The apparatus according to claim 1, wherein the light deflection surface deflects light from the waveguides by an angle of 90 degrees to the array of collimating lenses, such that the collimated light is perpendicular to an optical axis of light exiting the waveguides.

3. The apparatus according to claim 2, wherein the light deflection surface is slanted at an angle different than 45 degrees relative to the optical axis of light exiting the waveguides.

4. The apparatus according to claim 3, and comprising a light transparent material between the waveguides and the light deflection surface, the light transparent material having a refractive index selected to deflect the light from the waveguides, so that the deflection surface directs the light to the array of collimating lenses.

5. The apparatus according to claim 4, wherein the light deflection surface is included in a deflection substrate, distinct from the SiP device, and wherein the light transparent material attaches the SiP device to the deflection substrate.

6. The apparatus according to claim 1, wherein the optical waveguides are characterized by a first optical spot size, and wherein the collimating lenses are configured to provide light of a second optical spot size, larger than the first optical spot size.

7. The apparatus according to claim 1, and comprising a casing defining a slot or at least one pin configured to receive a ferrule of optical fibers, such that the fibers of the ferrule are aligned with the collimated light from the array of collimating lenses through the mirror.

8. The apparatus according to claim 1, and comprising a casing defining a slot or at least one pin configured to receive a ferrule of optical fibers, such that the fibers are aligned with the collimated light from the array of collimating lenses.

9. The apparatus according to claim 8, wherein the slot is configured to removeably receive the ferrule.

10. The apparatus according to claim 1, wherein the light deflection surface is included in a deflection substrate separate from the silicon photonics device.

11. The apparatus according to claim 10, wherein the array of collimating lenses are integrally defined in the deflection substrate.

12. The apparatus according to claim 10, wherein the deflection substrate and the silicon photonics device are aligned by elastic averaging alignment.

13. The apparatus according to claim 1, wherein the light deflection surface comprises a photo-imageable polymer deposited on the silicon photonics substrate.

14. An optical apparatus, comprising:
    a Silicon Photonics (SiP) device, which comprises multiple optical waveguides;
    an array of collimating lenses, configured to collimate light of the multiple optical waveguides into collimated beams; and
    a deflection element, distinct from the SiP device, including a light deflection surface which deflects light from the waveguides by an angle greater than 30 degrees, to the array of collimating lenses,
    wherein the array of collimating lenses is located on a face of the SiP device opposite a face of the SiP device contacting the deflection element.

15. The apparatus according to claim 1, comprising a plurality of deflection elements, each servicing a respective sub-group of one or more of the waveguides.

16. The apparatus according to claim 15, wherein at least two of the sub-groups of one or more of the waveguides extend to different lengths along the SiP device.

17. A method of transmitting an optical signal, comprising:
    transmitting an optical signal through a waveguide of a SiP device;
    deflecting the light transmitted from the waveguide by a deflection surface distinct from the SiP device, placed on a surface of the SiP device, by an angle greater than 30 degrees, to a collimating lens; and
    collimating the light by the collimating lens.

18. The method according to claim 17, wherein deflecting the light comprises deflecting the light from the waveguide by an angle of 90 degrees to the collimating lens, such that the collimated light is perpendicular to an optical axis of the light exiting the waveguide.

19. The method according to claim 18, wherein deflecting the light comprises deflecting by a light deflecting slanted surface, slanted at an angle different than 45 degrees relative to the optical axis of light exiting the waveguide.

20. The method according to claim 19, wherein deflecting the light comprises additionally deflecting the light by a light transparent material between the waveguide and the light deflecting slanted surface, the light transparent material having a refractive index selected to deflect the light, so that the slanted surface directs the light to the collimating lens.

21. The method according to claim 20, wherein the light transparent material attaches the SiP device to a light deflection substrate including the deflection surface.

22. The method according to claim 20, wherein transmitting the optical signal from the SiP device through a waveguide of the SiP device comprises transmitting light characterized by a first optical spot size, and wherein collimating the light comprises collimating the light to a beam having a second optical spot size, larger than the first optical spot size.

23. The method according to claim 22, wherein the second optical spot size is at least twice as great as the first optical spot size.

24. The method according to claim 17, and comprising directing the collimated light into an optical fiber.

25. The apparatus according to claim 1, wherein the multiple optical waveguides are located on an upper surface of the SiP device and wherein the deflection element is placed on the upper surface of the SiP device.

26. The apparatus according to claim 25, wherein the multiple optical waveguides terminate on a side face of the SiP device and emit light from the side face.

27. The apparatus according to claim 1, wherein the deflection element is coupled to the surface of the SiP device by an adhesive.

28. The apparatus according to claim 1, wherein the deflection element includes an etched groove defined to receive the SiP device.

29. The apparatus according to claim 1, wherein the deflection element is coupled to the surface of the SiP device using kinematic alignment.

* * * * *